Aug. 15, 1961   H. C. MONTGOMERY ET AL   2,996,028
ELEVATOR CONTROL APPARATUS FOR TORPEDOES
Filed Nov. 20, 1944
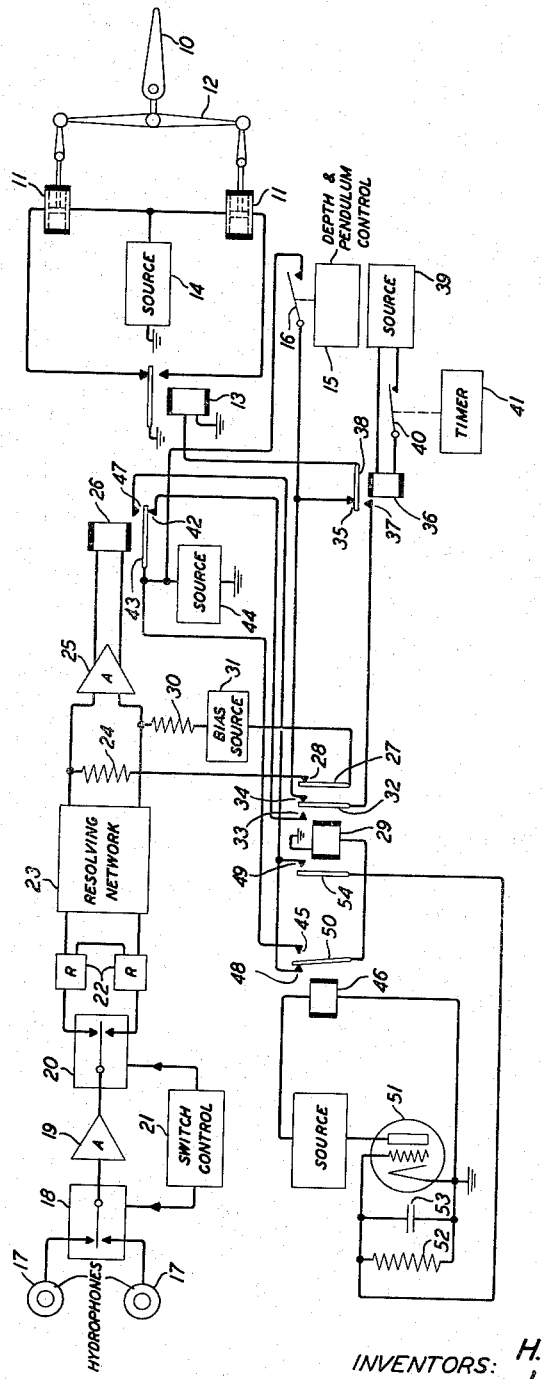
INVENTORS: H.C. MONTGOMERY
J.C. STEINBERG
BY:
Walter C. Kiesel
ATTORNEY

United States Patent Office 2,996,028
Patented Aug. 15, 1961

2,996,028
ELEVATOR CONTROL APPARATUS FOR TORPEDOES
Harold C. Montgomery, Chatham, and John C. Steinberg, Short Hills, N.J., assignors to Bell Telephone Laboratories, Incorporated, New York, N.Y., a corporation of New York
Filed Nov. 20, 1944, Ser. No. 564,340
9 Claims. (Cl. 114—25)

This invention relates to control circuits and more particularly to target signal responsive torpedo steering systems of the type disclosed in the application Serial No. 555,523, filed September 23, 1944, of John C. Steinberg.

In a torpedo having a steering system such as disclosed in the application above identified, for a period immediately following launching of the torpedo, the rudder is controlled, as by a gyroscope, to maintain the torpedo upon a preset course and the elevator is controlled, as by a depth and pendulum unit, to maintain the device at a preassigned depth and substantially level at this depth. Subsequently, control of the rudder and elevator is transferred to circuits responsive to signals emanating from a target, such as random and propeller noise emanating from a ship, and effective to cause deflection of the rudder and elevator to guide the torpedo to the target. The transfer from gyroscope and depth and pendulum control is effected by a gate element. In one particular form of system wherein each of the signal responsive circuits comprises a pair of hydrophones constituting the input elements and mounted so that the relation of the outputs thereof is a measure of the angle between the torpedo and target, and a resolving network for converting the hydrophone outputs in combination into a difference signal, e.g. potential, of polarity corresponding to the sign and of amplitude proportional to the magnitude respectively of the angle noted, the gate element may be a relay or relay system controlled from a point in the circuit at which the signal amplitude is proportional to the signal level at the hydrophones.

In a steering system provided with such an amplitude type gate, the target signal control range, that is the distance between target and torpedo at which transfer of the elevator and rudder to target signal control occurs obviously is dependent upon, among other factors, the signal output of the ship under attack. Necessarily, in order that the torpedo may attack a relatively quiet target under target signal control, the signal level requisite for operation of the gate must be made relatively low. Consequently, the range may vary considerably for different targets. Furthermore, for an elevator control system utilizing such a gate, the vertical angle between target and torpedo at which attack under signal control is initiated may vary considerably for different targets and may be quite small for noisy targets. A small angle of attack is undesirable for the reason that it increases the possibilities of a miss.

The signals received by the hydrophones are composed in part of target signals and in part of signals due to torpedo self noise. In order that false operation of the gate may not occur, it is necessary that the gate be set to operate for a signal level at the hydrophones above the self noise level. This may be considerably above the level for which the signal responsive system is capable of effecting control of the elevator to steer the torpedo toward the target in accordance with target signals even in the presence of self noise. Thus, the use of an amplitude gate entails a loss in target signal control range.

One general object of this invention is to improve torpedo steering systems of the type including both mechanical, e.g. gyroscope or depth and pendulum, and signal control portions.

More specifically, objects of this invention are to obtain substantial uniformity of target signal control range for torpedos having steering systems of the type above noted, to realize a substantially constant and relatively large initial attack angle in the vertical dimension for such torpedoes, and to decrease the loss in target signal control range associated with the use of a gate for effecting transfer from mechanical to signal control in such steering systems.

In accordance with one feature of this invention, in a torpedo steering system of the type described above, a gate element is provided in the elevator control system, which element is controlled in accordance with the difference signal obtained from the resolving network, and is so constructed and arranged that transfer of the elevator from depth and pendulum to target signal control is effected when this signal is of a prescribed polarity and amplitude. Thus, the point at which transfer occurs is determined by a vertical angle between the target and torpedo and is substantially independent of the absolute signal level at the hydrophones over a wide range. Consequently, uniformity of signal control range and angle at which attack with the elevator under target signal control is initiated are obtained. Also, inasmuch as control of the gate element is in accordance with the difference signal, the loss in target signal control range due to the use of a gate element is relatively small.

In accordance with another feature of this invention, means are provided for locking in the gate element, once it has operated, for a period of preassigned duration sufficient to allow the torpedo to complete its attack under target signal control.

The invention and the above noted and other features thereof will be understood more clearly and fully from the following detailed description with reference to the accompanying drawing in which the single figure is a circuit diagram, partly in functional block form, of an elevator control circuit for a torpedo, illustrative of one embodiment of this invention.

The system illustrated in the drawing comprises an elevator 10 which is deflectable in opposite directions to steer the torpedo upwardly or downwardly, by a pair of solenoids 11 the armatures of which are coupled to the elevator by a suitable linkage 12. The direction of deflection of the elevator is determined by which of the solenoids is energized and this is determined in turn by the condition of the elevator relay 13. Specifically, the two solenoids have one terminal in common connected to the source 14, such as a battery, and the other terminal connected to the respective contact of the elevator relay 13, the armature of the relay being connected to ground as shown. For reasons which will appear presently, in a specific system, the solenoids and relay contacts are so associated that down elevator is produced when the relay is energized and up elevator is produced when the relay is deenergized.

The relay 13 is subject to control in accordance with either the position of the torpedo relative to a preassigned depth or its position in the vertical dimension relative to a target. The control in accordance with the first position is effected by a depth and pendulum unit 15 and associated switch 16. This unit may be of known construction and therefore need not be described in detail here. Suffice it to say that this unit functions to control the relay 13, in the absence of other controls, to maintain the torpedo at a preassigned running depth and substantially level at this depth, by tending to open the switch 16 if the torpedo sinks below this depth or tilts downwardly and to close the switch if the torpedo rises above this depth or tilts upwardly.

Control in accordance with the second position, i.e. position in the vertical dimension relative to a target, is effected by a system responsive to signals emanating from a target, such as propeller and random noise emanating from a ship. This system may be of the construction described in detail in the application Serial No. 491,795, filed June 22, 1943, of Donald D. Robertson, and comprises a pair of hydrophones 17 mounted on the torpedo above and below the longitudinal axis thereof whereby the relative outputs of the two hydrophones is determined by the direction of the source of the signals received by the hydrophones, with respect to the torpedo. The hydrophones are connected in alternation, by a switch 18, to the input of an amplifier 19 provided with automatic volume control. The amplifier output is connected in alternation, by a second switch 20, to similar rectifiers 22. The two switches 18 and 20 are actuated in synchronism by a switch control 21, so that, as will be apparent, the input of each rectifier 22 corresponds to the output of a respective hydrophone 17. The rectifier outputs are combined in difference relation in a resolving network 23 to produce across a resistor 24 a direct current potential of polarity determined by and of amplitude proportional to the sign and magnitude respectively of the vertical angle between the target and the torpedo. Inasmuch as the amplifier 19 is provided with automatic volume control as noted heretofore, the difference potential appearing across the resistor 24 is substantially independent of the absolute signal level at the hydrophones 17 and, thus, is a true measure of the angle noted.

The resistor 24 is included in the input circuit of a direct current amplifier 25. The output circuit of the amplifier 25 includes a control relay 26 so constructed and arranged that when the resultant input signal to the amplifier is of one polarity the relay 26 operates and when this signal is of the opposite polarity, the relay releases. In a specific system, the resistor 24 is so associated with the network 23 that when the torpedo is headed below the target, the polarity of the difference potential appearing across the resistor 24 corresponds to that for which the relay 26 is energized.

Associated with the input circuit of the direct current amplifier 25 and normally included therein by way of the armature 27 and contact 28 of a transfer relay 29 are a resistor 30 and bias source 31, such as a battery, the resistor 30 and source 31 being correlated to impress upon the input circuit a potential of pre-assigned magnitude and of polarity corresponding to that for which the relay 26 is released.

The transfer relay 29 is provided with a second armature 32 and associated contacts 33 and 34, the contact 34 being connected to the switch 16 and to the contact 35 of an enabler relay 36, and the armature 32 being connected to the other contact 37 of the relay 36. The armature 38 of the relay 36 is connected directly to the elevator relay 13 as shown. The enabler relay 36 is energized from a source 39, the energizing circuit of which includes a switch 40 adapted to be closed by a timer 41 at the end of a period of preassigned duration following the launching of the torpedo or after the torpedo has traversed a prescribed distance after being launched. In either case, the construction advantageously is such that the switch 40 will be closed only when the torpedo has traveled to a position beyond the effective signal field of the launching vessel.

The contact 33 of the transfer relay is tied to the contact 42 of the control relay 26, the armature 43 of this relay being connected to the ungrounded side of a source 44, such as a battery, and to the contact 45 of an auxiliary relay 46. The other contact 47 of the relay 26 is connected to the other contact 48 of the relay 46 and to the contact 49 of the relay 29. The armature 50 of the relay 46 is connected to the winding of the relay 29.

The auxiliary relay 46 is included in the output circuit of a normally conductive electron discharge device 51, the grid circuit of which includes a condenser 53 and resistance 52. One common terminal of the resistance 52 and condenser 53 is connected to the armature 54 of the transfer relay 29.

The operation of the system is as follows: When the torpedo is launched, the various relays are in the condition shown in the drawing and the energizing circuit for the elevator relay 13 is controlled by the depth and pendulum unit 15 over the contact 35 and armature 38 of the enabler relay 36. When the torpedo has traversed a distance sufficient to place it beyond the effective signal field of the launching vessel, the switch 40 is closed whereby the enabler relay 36 is energized. If at this time the torpedo is not in such position relative to the target that the control relay 26 is energized, the energizing circuit for the elevator relay 13 remains under control of the depth and pendulum unit 15 over the armature 38 and contact 37 of the enabler relay 36 and armature 32 and contact 34 of the transfer relay 29.

When the torpedo reaches such position relative to the target that an up elevator differential signal is produced across the resistor 24, sufficient to overcome the down bias due to the source 31, the control relay 26 is energized so that the energizing circuit for the transfer relay 29 is closed from the source 44 over the armature 43 and contact 47 of the relay 26 and the armature 50 and contact 48 of the auxiliary relay 46. Energization of the transfer relay 29 removes the bias, due to the source 31, from the amplifier 25 by disengagement of the armature 27 from the contact 28. Also it results in transfer of the armature 32 from the contact 34 to the contact 33. Thus, the depth and pendulum unit 15 is effectively disconnected from the energizing circuit for the elevator relay 13 and this circuit is placed under control of the control relay 26 over the armature 38 and contact 37 of the enabler relay 36, armature 32 and contact 33 of the transfer relay 29 and armature 43 and contact 42 of the control relay 26. The latter operates or releases in accordance with the polarity of the potential appearing across the resistor 24 and, thus, results in deflection of the elevator 10 in accordance with the sign of the vertical angle between the torpedo and the target. Initially, of course, up elevator is produced.

Energization of the relay 29 as described above results also in closure of a circuit traced from the source 44, over armature 43 and contact 47 of the control relay 26 and armature 54 and contact 49 of the transfer relay 29 to one terminal of the resistance 52 and condenser 53. The source 44 is so poled that upon closure of this circuit a blocking potential is impressed upon the control grid of the device 51 and this device is rendered non-conducting. Consequently, the relay 46 releases and an obvious lock in circuit for the transfer relay 29 is closed at the armature 50 and contact 45 of the relay 46. Thus, the elevator relay 13 remains under control of the control relay 26 and the depth and pendulum unit 15 is dissociated from the elevator relay 13 as long as the relay 29 is locked up, irrespective of the position of the armature 43 of the relay 26. That is to say, for the period during which the transfer relay 29 is locked up, the elevator is controlled in accordance with target signals to steer the torpedo in the vertical dimension toward the target, and return to depth and pendulum control is prevented.

The length of the period for which the transfer relay 29 is locked up is dependent upon the time constant of the condenser-resistance combination 52, 53. The condenser and resistance are so correlated that the time required for the potential of the control grid of the device 51 to fall below the blocking value after the last energization of the control relay 26 is significantly greater than the hunting period of the torpedo on a pursuit course. Thus the transfer relay 29 remains locked up and the torpedo is permitted to complete its attack under target signal control.

In the event the torpedo missed on its attack, the target will be astern of and below the torpedo, hunting will cease and the control relay 26 will be deenergized. The device 51 will then unblock and become conductive, whereupon the relay 46 operates to open the lock in circuit for the relay 29, the latter releases and the elevator relay 13 is returned to control of the depth and pendulum unit 15, whereupon the torpedo tends to sink to its normal running depth. When it reaches such position that an up target signal potential across the resistor 24 sufficient to overcome the bias due to the source 31 is produced, the sequence of operations described above is repeated and the torpedo reattacks with the elevator under full target signal control.

It will be noted that the bias due to the source 31 determines the point in the path of the torpedo at which transfer of the elevator from depth and pendulum to target signal control occurs. Inasmuch as the potential appearing across the resistor 24 is a difference signal, the bias determines the initial attack angle. For any given normal running depth of the torpedo therefore uniformity of range, i.e. distance between target and torpedo at which attack with the elevator under target signal control is initiated, is attained. Furthermore, the bias enables fixing of the initial attack angle at a moderately large value, which is advantageous in that it reduces the possibilities of a miss. Also inasmuch as target signal control can obtain only for up elevator target difference signal, protection is afforded to a submarine from which the torpedo is launched.

It will be understood, of course, that the torpedo may be provided also with a target signal responsive circuit for controlling the rudder to steer the torpedo in the horizontal dimension. Such a circuit is described fully in the application of John C. Steinberg identified hereinabove and therefore description thereof here is deemed unnecessary.

Although the invention has been described with particular reference to a torpedo intended to be launched, as from a submarine, against a surface vessel, it may be utilized also in a torpedo intended to be launched, as from an aircraft or surface vessel, for use against a submerged target such as a submarine. In this case, of course, the bias due to the source 31 is made of such polarity that target signal elevator control can be initiated only when a down elevator difference signal of prescribed amplitude is produced across the resistor 24.

It will be understood that the specific embodiment of the invention shown and described is but illustrative and that various modifications may be made therein without departing from the scope and spirit of this invention as defined in the appended claims.

What is claimed is:

1. A steering system for a torpedo comprising an elevator, means for actuating said elevator, a first control means for controlling said actuating means to maintain the torpedo at a preassigned running depth, a second control means responsive to signals emanating from a target for controlling said actuating means to steer the torpedo to the target, said first control means being normally associated with said actuating means and said second control means being normally dissociated therefrom, transfer means for associating said second control means with said actuating means and dissociating said first control means therefrom, and means for operating said transfer means when the vertical angle between the torpedo and target is of preassigned sign and magnitude.

2. A steering system for a torpedo comprising an elevator, means for actuating said elevator, a first control means for controlling said actuating means to maintain the torpedo at a preassigned running depth, a second control means responsive to signals emanating from a target for controlling said actuating means to steer the torpedo to the target, said first control means being normally associated with said actuating means and said second control means being normally dissociated therefrom, transfer means for associating said second control means with said actuating means and dissociating said first control means therefrom, said second control means comprising a pair of hydrophones and means for resolving the outputs of said hydrophones in combination into a control signal of polarity and amplitude determined by the sign and magnitude respectively of the vertical angle between the torpedo and the target, and means controlled in accordance with said signal for operating said transfer means when said signal is of preassigned amplitude and polarity.

3. A steering system for a torpedo comprising an elevator, means for actuating said elevator, a first control means for controlling said actuating means to maintain the torpedo at a preassigned running depth, a second control means responsive to signals emanating from a target for controlling said actuating means to steer the torpedo to the target, said first control means being normally associated with said actuating means and said second control means being normally dissociated therefrom, transfer means for associating said second control means with said actuating means and dissociating said first control means therefrom, said second control means comprising a pair of hydrophones and means for resolving the outputs of said hydrophones in combination into a control signal of polarity and amplitude determined by the sign and magnitude respectively of the vertical angle between the torpedo and the target, means for producing a biasing signal of prescribed polarity and amplitude, and means controlled in accordance with the algebraic sum of said control and biasing signals for operating said transfer means when said control signal is of prescribed polarity and amplitude.

4. A steering system for a torpedo comprising an elevator, means for actuating said elevator, a first control means for controlling said actuating means to maintain the torpedo at a preassigned running depth, a second control means responsive to signals emanating from a target for controlling said actuating means to steer the torpedo to the target, said first control means being normally associated with said actuating means and said second control means being normally dissociated therefrom, transfer means for associating said second control means with said actuating means and dissociating said first control means therefrom, said second control means comprising a pair of hydrophones and means for resolving the outputs of said hydrophones in combination into a control signal of polarity and amplitude determined by the sign and magnitude respectively of the vertical angle between the torpedo and the target, relay means for operating said transfer means, an energizing circuit for said relay means, means for impressing a bias of prescribed polarity and amplitude upon said circuit, and means for impressing said control signal upon said circuit.

5. A steering system for a torpedo, comprising an elevator, actuating means for said elevator, depth and pendulum means for controlling said actuating means and normally associated therewith, means responsive to signals emanating from a target for producing a target signal of amplitude and polarity dependent upon the magnitude and sign respectively of the vertical angle between the torpedo and target, control means for controlling said actuating means in accordance with the polarity of the signal applied thereto, said control means being normally dissociated from said actuating means, means for applying to said control means a bias signal of preassigned amplitude and polarity, means for applying said target signal to said control means, transfer means controlled by said control means for associating said control means with said actuating means and dissociating said depth and pendulum means therefrom when said target signal is of a polarity and amplitude to overcome said bias, and means responsive to operation of said transfer means for disabling said bias applying means.

6. A steering system in accordance with claim 5 comprising means responsive to operation of said tranfer means for holding said transfer means operated for a period of preassigned duration.

7. A steering system for a torpedo, comprising an elevator, actuating means for said elevator, depth and pendulum means normally associated with said actuating means for maintaining the torpedo at a preassigned running depth, means responsive to signals emanating from a target for controlling said actuating means to steer the torpedo to the target, said signal responsive means being normally dissociated from said actuating means and comprising a pair of hydrophones, resolving means for converting the outputs of said hydrophones in combination into a signal of polarity determined by and amplitude proportional to the sign and magnitude respectively of the vertical angle between the torpedo and the target, an amplifier, means for impressing said signal upon the input circuit of said amplifier and a relay included in the output circuit of said amplifier, transfer means controlled by said relay for associating said signal responsive means with said actuating means and dissociating said depth and pendulum means therefrom when said relay is energized, and means for impressing a blocking bias of prescribed amplitude upon said input circuit.

8. A steering system in accordance with claim 7 comprising means for disabling said bias impressing means when said transfer means operates.

9. A steering system in accordance with claim 7 comprising means for locking in said transfer means for a period of preassigned duration after operation of said transfer means.

No references cited.